April 4, 1950     F. H. ROHR     2,502,753
FLEXIBLE JOINT AND FLEXIBLE UNIVERSAL JOINT
Filed Aug. 17, 1946     2 Sheets-Sheet 1

INVENTOR
FRED H. ROHR
BY *Everett N Curtis*
ATTORNEY

April 4, 1950 F. H. ROHR 2,502,753
FLEXIBLE JOINT AND FLEXIBLE UNIVERSAL JOINT
Filed Aug. 17, 1946

INVENTOR.
FRED H. ROHR
BY
ATTORNEY

Patented Apr. 4, 1950

2,502,753

UNITED STATES PATENT OFFICE 2,502,753

FLEXIBLE JOINT AND FLEXIBLE UNIVERSAL JOINT

Fred H. Rohr, San Diego, Calif.

Application August 17, 1946, Serial No. 691,343

7 Claims. (Cl. 285—91)

My invention relates to flexible joints and flexible universal points, particularly to pipe connections in the exhaust system of flexibly mounted internal combustion engines of airplanes; its objects are to relieve the engine of exhaust system weight and to prevent transmission of vibrations to the structure of the airplane from the engine during its operation; to induce better sealing and less friction and wear on the operative parts under operative conditions than has heretofore been possible; to expose the operative parts of the joint to the cooling effects of outside currents of air; to reduce to a minimum the amount or degree of energy required to operate the joint; to provide an unrestricted flow path for exhaust gases discharged from said engine while preventing impingement of such gases upon the operative parts of the joint; to provide effective lubrication of the contacting surfaces; to render the parts readily accessible for inspection, adjustment, replacement and repair and generally to provide a device which is efficient in action and of prolonged life and durability. These and other objects will appear from the drawing and as hereinafter described and set forth.

At the present time because of the increasing size of the larger types of airplane combustion engines, it has become necessary to devise new ways and means to preserve and sustain the flexibility of mountings while guarding the airplane from the effects of their vibration. Also due to the constantly increasing horsepower developed in such engines resulting in higher exhaust temperatures and pressures, a need has come about, in flexible pipe connections in the exhaust systems of said engines, for the prevention of the impingement of hot gases travelling at high velocities from the engine upon the operative parts of the joint, and for the cooling of such parts during the flow of such gases through the passageway thereof. So far as I am aware, prior to my invention, there is no device in the prior art which has accomplished these results. Previously designed joints have lacked my fundamental construction and arrangement of parts necessary effectively to operate at high temperature with a minimum amount of wear while securing the greatest possible flexibility and minimum exhaust leakage. All of these requirements, I believe have been met and accomplished by and in my invention in the manner hereinafter set forth.

Primarily my invention consists of a universal joint composed of one sleeve type joint interposed between two bell shaped joints, the combination and arrangement of which make possible the necessary radial and fore and aft movements of the parts during the flexing thereof. All of these joints are of stainless steel or other suitable material. Preferably the bell joints are shaped to receive two step-cut anti-friction rings of cast iron (preferably split) or material having equivalent properties, and are positioned and tight fitted remotely from the path of the hot gases to provide suitably cooled bearing surfaces engaging with the skirts of said joints, and to allow for expansion, growth and contraction while they are in use. All the joints may be lubricated by injecting graphite between the contacting surfaces of the rings and adjacent parts.

The general construction of my improved joint is such that there results an unrestricted gas flow, thereby eliminating expansion or contraction of the gases as they pass through such path; and the operative parts of the joint are so located as to be out of such path and in position to take advantage of the cooling effect of outside currents of air.

My device is also preferably so constructed that wearing and anti-friction cast iron rings, or rings of similar character, may be incorporated where needed to provide a bearing surface between moving contact surfaces, such rings being made light so as to add very little to the weight of the joint, and being arranged so as to be easily lubricated; thus reducing wear and friction to a minimum. The fact that the operative parts are cooled, that anti-friction and sealing rings are used, and that the joint is properly lubricated, allows the employment of close tolerances; all of which features being present in my improved joint greatly contribute to its utility and constitute a distinct advance in the art.

Fundamentally, my invention is designed to incorporate in one construction those elements which are required for a joint of this character to operate at a high temperature with the greatest possible flexibility, with a minimum amount of wear, and having the capacity to form an effective seal while such operation is taking place, so that manifold pressure may be maintained as required in the case of the use of modern turbosuperchargers.

Attention is hereby directed to the drawing, illustrating two preferred forms of my invention, in which similar numerals of designation refer to similar parts throughout the several views and in which—

Figure 1:
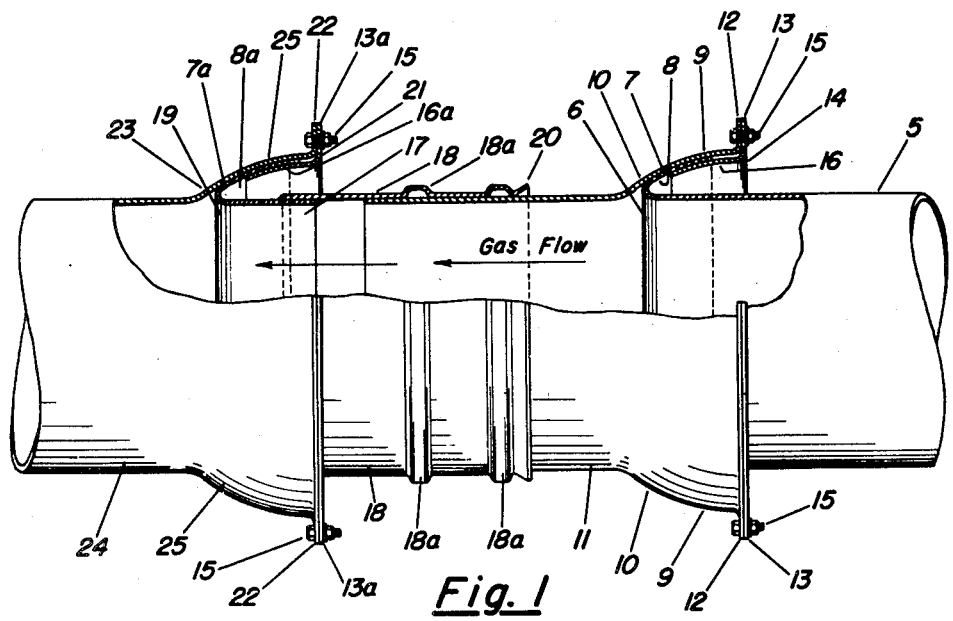
Figure 1 is a side elevation, partly in section, of one of the preferred forms of my improved universal joint.
Figure 2:
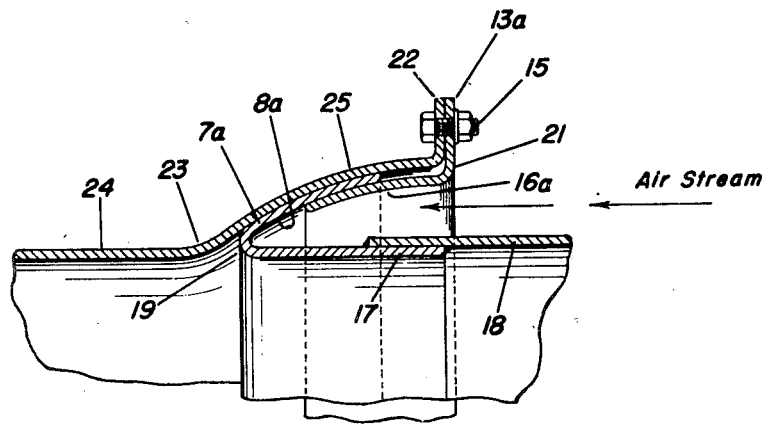
Figure 2 is an enlarged view of the detail of the connection of one of my bell shaped joints or members shown in section in Fig. 1.

Referring to the form of my improved joint shown in Figures 1 and 2 of the drawing, the conduit member 5 may be connected at its inner end in any manner well understood in the art into the exhaust system, a flexibly mounted internal combusion engine on such member being in the form of a pipe section having its outer end greatly expanded to form the bell 7 which is curved back so as to form the wide flaring annular recess 8, opening toward the rear of said section and located so as to expose operative parts of the joint to the cooling air stream surrounding the joint. Snugly engaged and in sliding contact with the curved outer surface of the bell 7 is the curved outer sheet 9 formed in the adjacent end of conduit member 11, the edge of which is bent outwardly to form the rim 12, abutting against and registering with the rim 13 of the inner shell 14, the said rims being firmly secured by bolts 15 or other suitable removable means well known in the art. As shown in the drawing, the inner shell 14 is bell shaped in form, and its skirt 16 is shaped to conform to and make sliding contact with the curved surface of bell 7 the bell 7 being interposed between the outer shell 9 and inner shell 14 and held in close sliding contact therewith and therebetween, and forming a flexible joint connecting the conduit members 5 and 11.

In sliding contact with the conduit member 11 is the conduit member 17, preferably formed in two parts, one of which is the pipe section 18 and the other the bell 7a; such parts for convenience of construction being made separate and joined together at their adjacent ends, but which may be made integral if desired.

In order that the section 18 may effect less frictional and better sliding contact with the outer wall of member 11, and for the purpose of reinforcing the same, this section may be constructed with the annular recesses 18a pressed outwardly in the wall thereof and with the outwardly flaring mouth 20. Into these annular recesses obviously may be inserted anti-friction rings. As shown, the bell 7a is similar in form and construction to the bell 7.

Closely engaging with and conforming to the inner wall of the bell 7a, is the inner shell 21, similar in form and construction to the inner shell 14; having a similar curved skirt 16a and rim 13a, which rim abuts against and is secured to the rim 22 of the outer shell 23 of conduit member 24 in the same manner and form as the rim 12 and 13 of conduit members 5 and 11, as hereinbefore set forth. Snugly engaging and in sliding contact with the curved outer surface of the bell 7a, is the curved outer shell 25, forming a flexible joint connecting the conduit members 17 and 24 in a manner similar to the connection of conduit members 5 and 11; the bell 7a being interposed between the outer shell 25 and the inner shell 21. As is customary in the art, the outer end of the conduit member 24 is firmly secured to resist movement while conduit member 5 is attached to the moving portion of the exhaust system.

As will be observed from the drawing, all of the operative parts of this construction are shielded at all times from the impingement of gases thereon coming from the engine, and are exposed to the cooling air stream.

Figure 3:
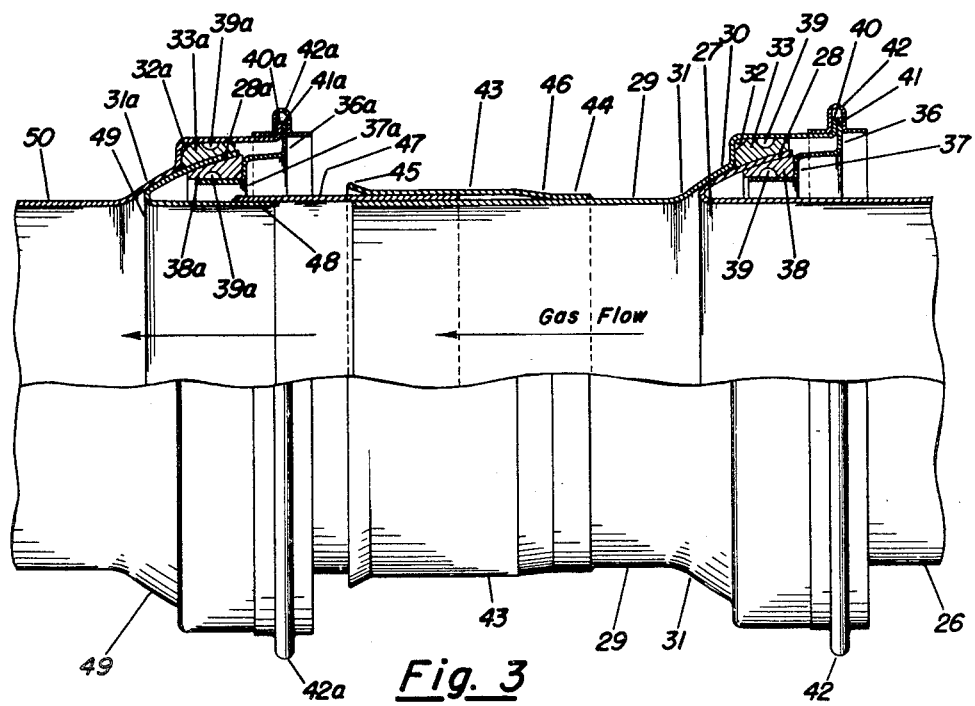
Figure 3 is a side elevation, partly in section, of another preferred form of my invention, in which is incorporated the wearing and anti-friction rings to provide a bearing surface consistent with the flexibility and sealing requirements.
Figure 4:
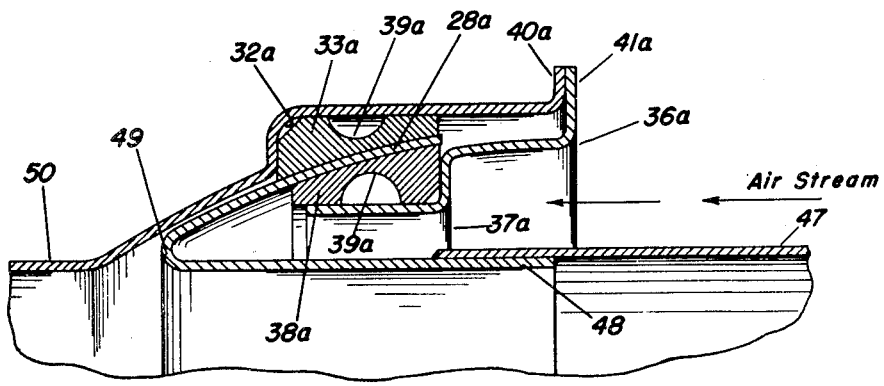
Figure 4 is an enlarged view in detail of the connection of certain parts shown in section in Fig. 3.

In Figures 3 and 4, I have illustrated a modified form of my invention showing the provision of cast iron (preferably split) or other anti-friction and sealing rings for the purpose of reducing wear and friction. In this form of joint, the construction of conduit member 26, including bell 28, is similar to that of conduit member 5 shown in Figures 1 and 2. Conduit member 29, however, is different in construction from member 11, in that the outer shell 30 is formed with the annular recess 32 in which is seated the anti-friction ring 33, preferably supplied with cutouts 39 for lightening the same, and having its inner surface curved to conform to, and make sliding contact with the outer surface of bell 28. Taking the place of inner shell 14, is the inner shell 36, having the annular step 37 shaped to receive and seat the anti-friction ring 38, similar in form to ring 33 but having its outer surface curved to conform to and to make sliding contact with the inner surface of the bell 28. As shown, the rim 40 of the outer shell 31 and the rim 41 of the inner shell 36 are formed and positioned to abut and make registering contact and are secured together by my new type of clamp 42 or other suitable means well known in the art. Preferably, I provide the outer end of the conduit member 29 with the enveloping sleeve 43, spaced therefrom for the greater part of its length, but having its inner end 44 contracted to make contact with and to be joined to the body of said member 29, and having its outer end expanded to form the flaring mouth 45; the general construction being such as to provide a slip-joint 46, within which the inner end of the pipe section 47, forming part of the conduit member 48, may be inserted. As shown, the conduit member 48 is preferably formed in two parts, one being the pipe section 47 and the other being the bell 28a; such parts for convenience of construction being made separate and joined together at their adjacent ends, but which if desired may be made integral; also said bell 28a is similar in form to the bell 28. Also similar to the connection of conduit members 26 and 29, is the connection of conduit members 48 and 50; the member 50, corresponding to member 29, being provided with outer shell 31a, annular recess 32a, ring 33a and cut-out 39a, and rim 40a, and the inner shell 36a, corresponding to inner shell 36, being provided with annular step 37a, ring 38a, and the rim 41a; the said rims 40a and 41a being connected and secured by my new type of clamp 42a, or other suitable means. In this form of construction, also flexibility is obtained in the bell joint by arranging the contacting surfaces so that stainless steel will bear against cast iron or other suitable anti-friction material serving to reduce friction. Flexibility of the joint may be further improved by the application of graphite or other lubricant which this form of construction makes possible. Joint leakage is reduced to a minimum in the case of the bell joints by employing close tolerances which are obtainable by the use of anti-friction rings retained by inner and outer shells, by the fact that the operative parts of the joint are exposed to the cooling air stream and by the fact that the joint may be lubricated.

Where I have referred to "anti-friction" rings in this specification and claims, I desire to be understood as including rings which also perform the function of sealing means, and which for the purposes of my invention are heat resistant in character.

My invention may be embodied in other specific forms in whole or in part without departing from the spirit or essential characteristics thereof. The present embodiment, as above set forth, is therefore to be considered in all respects as illustrative and not restrictive, the scope of my invention being indicated by the appended claims rather than by the above description, and all changes that come within the meaning of equivalency of the claims are therefore intended to be embraced therein.

What I claim and desire to secure by Letters Patent is:

1. A flexible metallic joint for use in a combustion engine exhaust system embodying the combination of a bell type skirt interposed between an inner and outer shell, the outer end rims of the inner and outer shell being firmly secured, one to the other and between which the bell type skirt is slidingly interposed to form a coupled joint, the skirts of said shells having annular recesses located in the walls thereof, anti-friction rings seated in said recesses and positioned and shaped to bear against the surface of the bell type skirt slidingly interposed therebetween.

2. A flexible metallic joint for use in a combustion engine exhaust system embodying the combination of a bell type skirt interposed between an inner and outer shell, the outer end rims of the inner and outer shell being firmly secured one to the other and between which the bell type skirt is slidingly interposed to form a coupled joint, the skirts of said shells have annular recesses located in the walls thereof, anti-friction rings seated in said recesses and positioned and shaped to bear against the surface of the bell type skirt slidingly interposed therebetween, the operative parts of which are located so as to be guarded from the impingement of hot gases passing through said joint and to be exposed to cooling air currents.

3. A flexible metallic joint embodying the combination of a slip joint in conjunction with a flexible metallic joint consisting of a bell type skirt interposed between an inner and outer shell, the outer end rims of the inner and outer shell being firmly secured one to the other and between which the bell type skirt is slidingly interposed to form a coupled joint, the skirts of said shells have annular recesses located in the walls thereof, anti-friction rings seated in said recesses and positioned and shaped to bear against the surface of the bell type skirt slidingly interposed therebetween.

4. A flexible metallic joint embodying the combination of a slip joint in conjunction with a flexible metallic joint consisting of a bell type skirt interposed between an inner and outer shell, the outer end rims of the inner and outer shell being firmly secured one to the other and between which the bell type skirt is slidingly interposed to form a coupled joint, the skirts of said shells have annular recesses located in the walls thereof, anti-friction rings seated in said recesses and positioned and shaped to bear against the surface of the bell slidingly interposed therebetween, the operative parts of which are located so as to be guarded from the impingement of hot gases passing through said joint and to be exposed to cooling air currents.

5. A flexible metallic universal joint embodying the combination of a slip joint between two flexible metallic joints each consisting of a bell type skirt interposed between an inner and outer shell, the outer end rims of the inner and outer shell being firmly secured one to the other and between which the bell type skirt is slidingly interposed to form a coupled joint, the skirts of said shells of such bell shaped flexible joints have annular recesses located in the walls thereof, anti-friction rings seated in said recesses and positioned and shaped to bear against the surface of the bell slidingly interposed therebetween.

6. A flexible metallic universal joint, embodying the combination of a slip joint between two flexible metallic joints, each consisting of a bell type skirt, and an inner and outer shell, the outer end rims of the inner and outer shells being firmly secured, one to the other, and between which the bell type skirt is slidingly interposed to form a coupled joint, the operative parts of such bell shaped flexible joints forming an annular cavity, open to the atmosphere in a manner to expose said operative parts to the flow of cooling air currents and in which said parts are guarded from the impingement of hot gases.

7. A flexible metallic universal joint, embodying the combination of a slip joint between two flexible metallic joints, each consisting of a bell type skirt, and an inner and outer shell, the outer end rims of the inner and outer shells being firmly secured, one to the other, and between which the bell type skirt is slidingly interposed to form a coupled joint; annular recesses formed in the walls of said inner and outer shells, and anti-friction rings seated within said recesses, said rings shaped and positioned to bear against the surface of the bell type skirt slidingly interposed therebetween; the operative parts of such bell shaped flexible joints forming an annular cavity, open to the atmosphere in a manner to expose said operative parts to the flow of cooling air currents, and which said parts are guarded from the impingement of hot gases.

FRED H. ROHR.

REFERENCES CITED

The following references are of record in the file of this patent:

UNITED STATES PATENTS

| Number | Name | Date |
| --- | --- | --- |
| 1,906,575 | Goeriz | May 2, 1933 |
| 2,295,907 | Lewis | Sept. 15, 1942 |
| 2,329,369 | Haver | Sept. 14, 1943 |
| 2,381,426 | Allen et al. | Aug. 7, 1945 |
| 2,388,924 | Mercier | Nov. 13, 1945 |